United States Patent [19]

Ohkubo

[11] Patent Number: 4,595,382
[45] Date of Patent: Jun. 17, 1986

[54] POWER TRANSMISSION MECHANISM WITH TORQUE CONVERTER

[75] Inventor: Masahiro Ohkubo, Kadoma, Japan

[73] Assignee: Kabushiki Kaisha Daikin Seisakusho, Osaka, Japan

[21] Appl. No.: 672,627

[22] Filed: Nov. 19, 1984

[30] Foreign Application Priority Data

Dec. 27, 1983 [JP] Japan .................... 58-248534

[51] Int. Cl.$^4$ ................ F16D 3/06; F16D 3/50
[52] U.S. Cl. ..................... 464/82; 464/100
[58] Field of Search .............. 192/106.1; 267/30, 136, 267/152, 158; 464/81, 82, 84, 100, 101

[56] References Cited

U.S. PATENT DOCUMENTS

| 1,165,551 | 12/1915 | Smith | 464/100 |
|---|---|---|---|
| 1,659,311 | 2/1928 | Candee | 464/82 |
| 2,588,668 | 3/1952 | Syrouy | 464/98 X |
| 2,858,681 | 11/1958 | Smirl et al. | 464/84 X |
| 3,275,108 | 9/1966 | General et al. | 464/81 X |
| 3,336,765 | 8/1967 | Fawick | 464/82 |
| 3,873,077 | 3/1975 | Jorn | 267/152 |

FOREIGN PATENT DOCUMENTS

| 280879 | 7/1934 | Italy | 464/82 |
|---|---|---|---|
| 1243237 | 8/1971 | United Kingdom | 464/84 |
| 310066 | 7/1971 | U.S.S.R. | 464/82 |

Primary Examiner—Stuart S. Levy
Assistant Examiner—Daniel P. Stodola
Attorney, Agent, or Firm—Burns, Doane, Swecker & Mathis

[57] ABSTRACT

A power transmission mechanism with converter has the input side flywheel and output side torque converter disposed concentrically, with the front cover of the torque converter being coupled with the flywheel, wherein a leaf spring being approximately parallel to the center line in the widthwise direction is radially placed between the front cover and flywheel in order to couple the front cover and flywheel elastically in the circumferential direction, and the leaf spring and at least one of the front cover and flywheel possess a play which may allow the front cover and flywheel to move relatively in the radial direction and in the direction of center line.

6 Claims, 4 Drawing Figures

POWER TRANSMISSION MECHANISM WITH TORQUE CONVERTER

FIELD OF THE INVENTION

This invention relates to a power transmission mechanism with torque converter mainly suitable for a heavy vehicle.

DESCRIPTION OF THE PRIOR ART

As a coupling structure between the engine side flywheel and the output side torque converter, a structure of using a discshaped input plate extending in a direction vertical to the center line, or a structure of meshing by setting internal teeth in either flywheel or converter and external teeth in the other has been employed.

In the input plate method, however, only a small torque can be transmitted. Or if it is attempted to transmit a greater torque by increasing the thickness of the plate, the plate loses its flexibility and other parts may be broken. In the other gear coupling method, a large torque can be transmitted and a misalignment can be absorbed, but the damper action is lost as the torque fluctuates, or the tooth surface may be worn to give off unusual noise.

SUMMARY OF THE INVENTION (Objectives of the Invention)

(a) Since the inertia is relatively great in the parts of the torque converter which are directly coupled with the flywheel (such as pump housing), a huge torsional torque is built up in the joint area between the flywheel and torque converter once torque fluctuations occur in the engine. The present invention is intended to absorb such torsional torque to prevent the joint and torque converter from breaking down.

(b) It is also designed to absorb the misalignment at the flywheel side and torque converter side to prevent occurrence of excessive force acting on the bearing parts and others, thereby extending the service life of the power transmission mechanism.

(c) The constitution is simple and is manufacturable at low cost.

(Constitution of the Invention)

This invention relates to a power transmission mechanism with torque converter having the input side flywheel and the output side torque converter arranged concentrically, with the front cover of the torque converter being coupled with the flywheel, which possesses the following requirements.

(a) Leaf springs which are approximately parallel to the center line in the widthwise direction are radially installed between the front cover and flywheel, and the front cover and flywheel are elastically coupled together in the circumferential direction.

(b) The leaf springs and at least one of front cover and flywheel possess such a play as to allow the front cover and flywheel to move relatively in the radial direction and the center line direction.

DETAILED DESCRIPTION OF THE INVENTION

Figure 1:
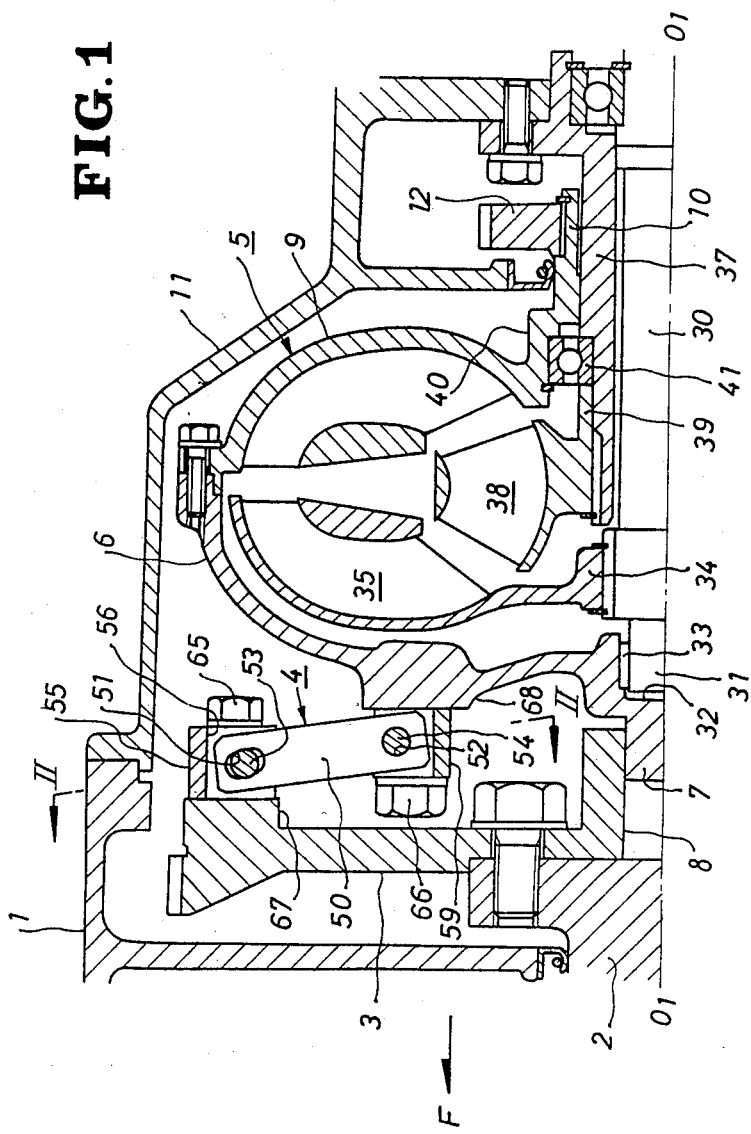
FIG. 1 is a partial vertical section of the power transmission mechanism of this invention.

In FIG. 1 (arrow F denotes the front side), a flywheel 3 is fixed concentrically to the end of a crankshaft 2 projecting from a crankcase 1 at the engine side. A front cover 6 of a torque converter 5 is coupled to the flywheel 3 by way of a joint 4 (which is described later) concentrically around the center line $O_1$—$O_1$. A forward projecting boss 7 is formed in the center of the cover 6, and it fits slidably and rotatably into a hole 8 formed in the center of the flywheel 3. A concentric pump housing 9 is opposedly fixed on the outer periphery of the rear end of the cover 6. A guide pipe 10 is integrally formed in the internal circumferential part of the housing 9, and the end part of the pipe 10 is fitted and fixed to the inside hole of a gear 12 which drives a gear pump (not shown) in a torque converter housing 11.

Inside the guide pipe 10 is disposed an output shaft, at a certain spacing, around the center line $O_1$—$O_1$, and an end part 31 of the output shaft 30 is rotatably fitted and supported to a recess 32 provided in the center of the front cover 6 by way of a needle bearing 33. The spline formed on the outside of the output shaft 30 fits with a turbine hub 34, and a turbine impeller 35 is concentrically formed on the outside of the hub 34. A stator shaft 37 is disposed concentrically and at a certain spacing between the guide pipe 10 and output shaft 30, and the rear end of the shaft 37 is fixed to the torque converter housing 11. An outer spline is fomred at the end of the shaft 37, and it is fitted with the spline of a hub 39 of a stator impeller 38. There is a ball bearing 41 between an internal boss 40 of the pump housing 9 and the stator shaft 37, and the housing is rotatably supported on the shaft 37 by it. The torque converter housing 11 projects forward to cover the torque converter 5 wholly, and its front end is fixed to the rear end of the crankcase 1.

Figure 2:
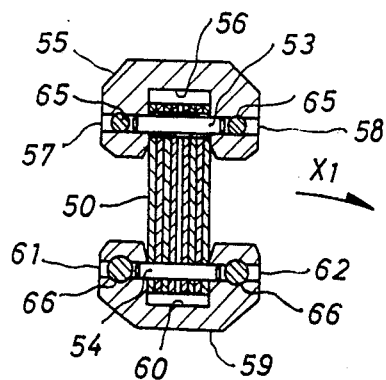
FIG. 2 is a view of II—II section of FIG. 1.

The joint 4 is mainly composed of a leaf spring 50 of an approximately rectangular shape which is disposed nearly in radial form. The spring 50 is longer in the radial direction of wheel 3, and is disposed so as to be nearly parallel to the center line $O_1$—$O_1$ in the widthwise direction, and it possesses a slit 51 longer in the longitudinal direction of the spring 50 at the upper end part and a circular hole 52 at the lower end part. As shown in FIG. 2, the spring 50 comprises plural leaves which are laminated to form a group, and it has two pins 53, 54 extending in the tangential direction of the rotating direction (the arrow $X_1$ direction). The outer side end of the spring 50 (the upper end part in FIG. 1) is fitted to a recess 56 which is open toward the central side formed in a holding member 55 having a generally U-shaped cross section, and both end of the pin 53 projecting from the spring 50 are fitted and supported in holes 57, 58 formed in the holding member 55. The inner side end of the spring 50 is fitted to a recess 50 which is open toward the outer circumference side formed in a holding member 59 having a generally U-shaped cross section, and both ends of the pin 54 projecting from the spring 50 are fitted and supported in holes 61, 62 formed in the holding member 59.

Reamer bolts 65, 66 penetrate at right angle into the holes 57, 58, and 61, 62 (in the direction parallel to the center line $O_1$—$O_1$ in FIG. 1) in order to prevent the pins 53, 54 from slipping out. The holding member 55 is fixed to the boss 67 formed on the outer circumference of the flywheel in FIG. 1 by means of bolt 65, and the holding member 59 is fixed to the boss 68 formed at the inner side of the front cover 6 by means of bolt 66. As a result, the leaf spring 50 is, with its outer side slightly inclined forward, is disposed so as to be free to rotate around the pins 53, 54 and to slide in the longitudinal direction of the slit 51 with respect to the pin 53.

Thus structured joint 4 is provided by a plurality and is mounted between a plurality of bosses 67, 68 provided at equal spacing in the circumferential direction formed on the flywheel 3 and front cover 6.

The operation is described below. When the engine runs to rotate the crankshaft 2, the torque is transmitted to the pump housing 9 by way of the flywheel 3, joint 4, and front cover 6. When the housing 9 rotates, the gear pump (not shown) is driven through the gear 12, and the turbine wheel 35 is rotated at the same time through the hydraulic fluid in the torque converter 5, so that an output is obtained from the output shaft 30. Suppose, here, a torsional vibration torque builds up between the flywheel 3 and torque converter 5, then the leaf spring 50 deflects in the rotating direction (the $X_1$ direction in FIG. 2) or its reverse direction depending on the magnitude of the torque, so that the torsional torque is absorbed. Incidentally, the joint 4 withstands heat sufficiently because the leaf spring 50 is used.

In the assembling process, on the other hand, inevitable misalignments may occur due to machining error between the boss 7 and hole 8, or crankcase 1 and torque converter housing 11. Of these misalignments, the error in the direction of the center line $O_1$—$O_1$ is absorbed as the leaf spring 50 rotates about the pins 53, 54, while the error in the radial direction is canceled when the leaf spring 50 moves in the longitudinal direction of the slit 51 with respect to the pin 53.

(Effects of the Invention)

The leaf spring 50 which is approximately parallel to the center line $O_1$—$O_1$ in the widthwise direction is placed between the front cover 6 and flywheel 3 in radial form, and the front cover 6 and flywheel are coupled together elastically in the circumferential direction, and there is a play between the leaf spring 50 and at least one of the front cover 6 and flywheel 3 allowing the front cover 6 and flywheel 3 to move relatively in the radial direction and in the direction of center line $O_1$—$O_1$ (for example, rotation and sliding between the slit 51 and pin 53, and rotation between the hole 52 and pin 54). Therefore:

(a) Since the torsional torque between the flywheel 3 and torque converter 5 can be absorbed, damage of the joint 4, torque converter 5 and gear pump (not shown) may be prevented.

(b) Since the misalignments can be absorbed, occurrence of an excessive force acting on the bearing (for example, needle bearing 33) and others may be prevented, and the service life may be extended.

(c) The structure is as simple as to mount the leaf spring 50, which may be manufactured easily and at low cost.

(Other embodiments)

Figure 3:
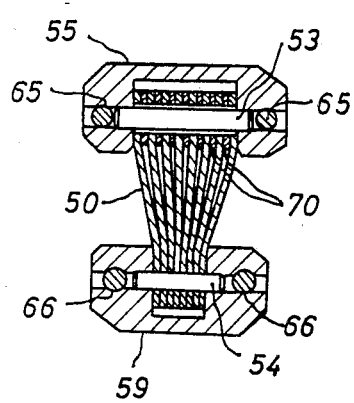
FIG. 3 is a portion of other embodiment corresponding to the area of FIG. 2.

(a) The joint may be structured as shown in FIG. 3, in which a pad 70 to be penetrated through the pin 53 is inserted between the outer circumferential parts of each leaf spring 50. As the pad, something having a damping effect may be used, and for example, a rubber-like elastic body is employed.

Figure 4:
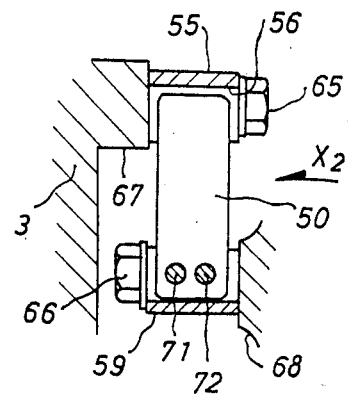
FIG. 4 is a partial vertical section of another embodiment.

(b) Another constitution may be proposed for the joint 4 as shown in FIG. 4, in which the leaf spring 50 is fixed to the holding member 59 of the inner side by means of two pins 71, 72 planted parallel in the direction of center line $O_1$—$O_1$ (FIG. 1), and the outer side end of the spring 50 is fitted to the recess 56 in the holding member 55 to be free to slide in the direction of center line $O_1$—$O_1$ (FIG. 1) and in the radial direction. In this case, in the assembling process, since the spring 50 may be fitted to the member 55 in the arrow $X_2$ direction after fixing the spring 50 to the member 59 preliminarily, the assembling is simplified.

What is claimed is:

1. A power transmission mechanism with torque converter having an input side flywheel an output side torque converter disposed concentrically with the flywheel, with a front cover of the torque converter being coupled with the flywheel, wherein at least one leaf spring being approximately parallel to the center line in the widthwise direction is radially placed between the front cover and flywheel in order to couple the front cover and flywheel elastically in the circumferential direction, and the leaf spring and at least one of the front cover and flywheel possess a play which may allow the front cover and flywheel to move relatively in the radial direction and in the direction of center line.

2. A power transmission mechanism with torque converter as set forth in claim 1, wherein a slit longer in the radial direction is provided at one end of said leaf spring and a circular hole is provided at the other end, and two pins extending in the tangential direction of the rotating direction are fitted into these holes so as to support the spring in a manner free to rotate around the pin and slide in the longitudinal direction of the slit.

3. A power transmission mechanisms with torque converter as set forth in claim 2, wherein a plurality of leaf springs are laminated to form a group, and a plurality of these groups are disposed at equal intervals in the circumferential direction.

4. A power transmission mechanism with torque converter as set forth in claim 3, wherein the inner and outer side ends of said leaf spring are fitted to supporting members having a generally U-shaped cross section, and both ends of the pins are fitted and supported to the supporting members, while reamer bolts penetrating through the supporting members at right angle to the pins prevent the pins from slipping out.

5. A power transmission mechanism with torque converter as set forth in claim 3, wherein a pad to be penetrated by one of the pins is inserted between leaf springs forming one of the groups of leaf springs, and this pad is made of a material possessing a damping effect.

6. A power transmission mechanism with torque converter as set forth in claim 1, wherein the leaf spring is fixed to the supporting member of the inner side, and the outer side end of the leaf spring is fitted in the recess in the outer side holding member to be free to rotate in the direction of center line and to slide in the radial direction.

* * * * *